United States Patent [19]
Peck et al.

[11] 3,976,922
[45] Aug. 24, 1976

[54] LOW IMPEDANCE MULTIPLE ELECTROLYTIC CAPACITOR ASSEMBLY

[75] Inventors: David B. Peck; Edward C. Geissler, both of Williamstown, Mass.

[73] Assignee: Sprague Electric Company, North Adams, Mass.

[22] Filed: June 27, 1975

[21] Appl. No.: 591,197

[52] U.S. Cl. .......................... 317/231; 317/101 C; 317/230
[51] Int. Cl.² ........................................ H01G 9/00
[58] Field of Search ................. 317/230, 231, 101 C

[56] References Cited
UNITED STATES PATENTS

| | | | |
|---|---|---|---|
| 2,537,959 | 1/1951 | Beverly | 178/44 |
| 2,596,166 | 5/1952 | Peterson | 317/101 C |
| 3,475,659 | 10/1969 | Buice et al. | 317/230 |
| 3,588,630 | 6/1971 | Miller et al. | 317/230 |
| 3,621,112 | 11/1971 | Stickley et al. | 317/101 C |
| 3,654,524 | 4/1972 | Puppolo et al. | 317/230 |

OTHER PUBLICATIONS

H. Puppolo et al., "A Stacked Foil or 'Book' Type Aluminum Electrolytic Capacitor," Proc., 1970, Electr. Comp. Conf., Wash., D. C., May 13–15, 1970, pp. 432–436.

*Primary Examiner*—Michael J. Lynch
*Assistant Examiner*—Joseph E. Clawson, Jr.
*Attorney, Agent, or Firm*—Connolly and Hutz

[57] ABSTRACT

Each of at least four electrolytic capacitor packages contains a convolutely wound valve-metal foil capacitor section having package leads connected to tabs that contact the foils in a central region thereof. The package leads extend from one face of each package, and are threaded through holes in a double-sided printed wiring board that serves as a stripline. The anode leads are connected to one metal face of the stripline and the cathode leads to the other, the metal on each face of the stripline covering a major portion of the insulating board. This combination of simple centrally connected foil-type capacitors being connected by means of very short leads to a stripline provides a low impedance multiple capacitor assembly having good high frequency performance and low cost.

10 Claims, 11 Drawing Figures

U.S. Patent  Aug. 24, 1976  3,976,922
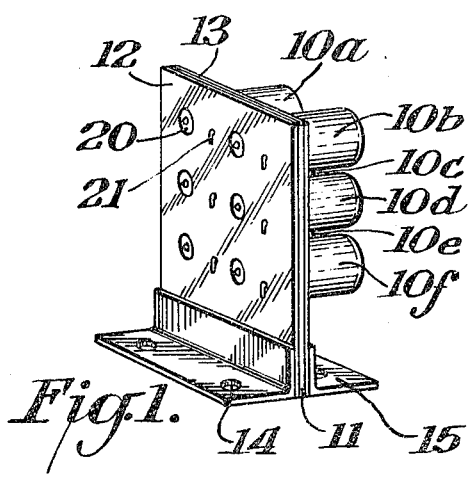
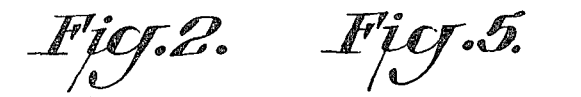
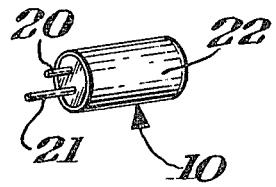
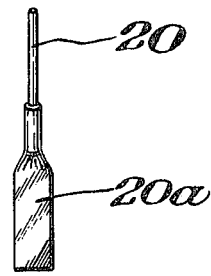
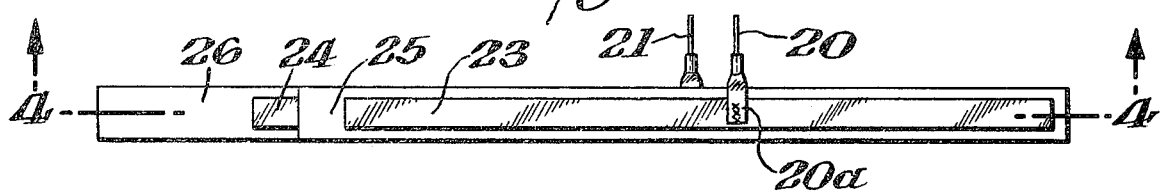
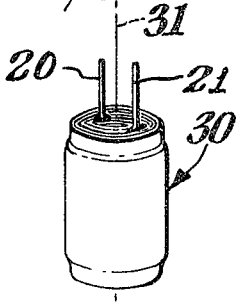
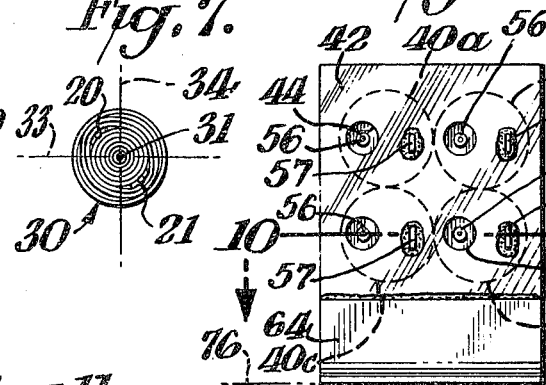
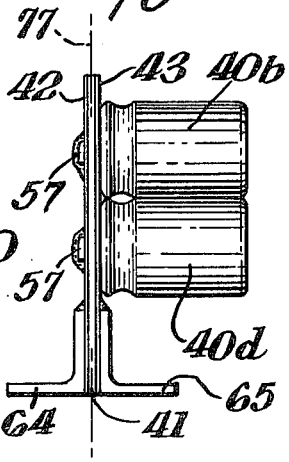
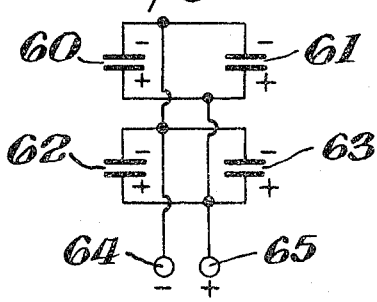
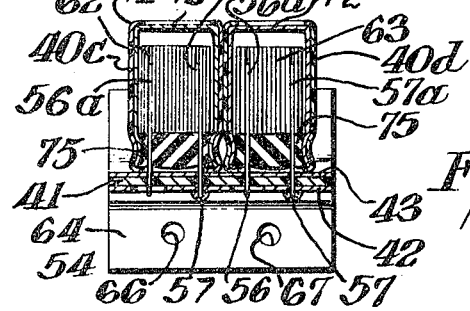

LOW IMPEDANCE MULTIPLE ELECTROLYTIC CAPACITOR ASSEMBLY

BACKGROUND OF THE INVENTION

This invention relates to a low impedance multiple capacitor assembly, and more particularly to such an assembly having low impedance over a broad frequency spectrum.

The connection of electrolytic capacitors in parallel by users to increase the total effective capacitance and to reduce the effective impedance at low frequencies is well known. Such multiple capacitor assemblies also generally exhibit a lower impedance at high frequencies, in which instance the effective series resistance (ESR) and the effective series inductance (ESL) of the individual capacitors tend to become the dominant factors determining the total effective series impedance (Z) of the individual capacitor packages. The ESL of a typical electrolytic capacitor is largely attributable to the leads of the capacitor package. Low impedance electrolytic capacitor packages have been devised employing a plurality of capacitor sections connected without leads to an internal low impedance stripline. Such constructions are described by Puppolo et al in U.S. Pat. No. 3,654,524 issued Apr. 4, 1972.

However, the costs of such prior art construction tend to be high, and a simpler but similar multiple capacitor section package employing tail connection of sections to a stripline is described by Markarian et al in pending U.S. patent application Ser. No. 358,207 filed May 7, 1973 toward reducing these costs. Although these multiple section packages provide excellent filtering performance in d.c. power supplies that may be used in computers or that may be of the relatively high frequency switching regulator type, the demand for even lower costs for such capacitors prevails.

It is therefore an object of this invention to provide a multiple electrolytic capacitor assembly having a low impedance over a broad frequency spectrum and having very low cost.

SUMMARY OF THE INVENTION

A low impedance multiple electrolytic capacitor assembly includes at least four electrolytic capacitor packages. Each of the packages comprises a convolutely wound foil-type electrolytic capacitor section enclosed in a housing. An anode lead and a cathode lead extend from a common end face of the housing.

A stripline, preferably made from a standard double copper clad printed wiring board has pairs of holes therein adapted for threading the generally axially extending leads of each of the capacitor packages therethrough. A portion of the copper sheet on either side of the insulating board of the stripline is removed in the region of one of the holes in each pair, so that a solder reflow connection may be made between one copper sheet and all the anode leads and between the other copper sheet and all of the cathode leads.

An extension of the stripline is provided for easy electrical access and for the mounting of the assembly. The capacitor section of each of the capacitor packages if formed by winding together an anode foil and a cathode foil which are interleaved and separated by insulating webs. The insulating webs are preferably of porous paper impregnated with an electrolyte. An anode tab and a cathode tab are connected to the anode and cathode foils, respectively; the position of the attachment being in a region along each respective foil that lies between ¼ to ¾ of the length of the foil relative to an end thereof.

The combination in the assembly of this invention of foil-type electrolytic capacitor packages with leads extending from one face of each package, the leads being required to extend only a very short distance to their connection points at the stripline, has been found to exhibit a surprisingly low impedance over a broad range of frequencies. At the same time the simple capacitor packages are readily amenable to manufacture by low cost standard techniques. Furthermore the stripline may be a simple double-sided printed wire board, and the mounting of the capacitor packages thereto may consist of the elementary steps of threading the leads into the holes, crimping the cathode leads, and reflow soldering.

BRIEF DESCRIPTION OF THE DRAWING

FIG. 1 shows a perspective view of a multiple capacitor package assembly of this invention.

FIG. 2 shows a separate perspective view of a typical capacitor package of the assembly shown in FIG. 1.

FIG. 3 shows a top view of an anode and a cathode foil interleaved with and spaced by insulative paper webs.

FIG. 4 shows a side sectional view of the interleaved foils of FIG. 3 taken in section 4—4 thereof.

FIG. 5 shows a typical tab connected to a lead wire as employed in the interleaved foils illustrated in FIGS. 3 and 4.

FIG. 6 shows in perspective view a convolutely wound foil-type capacitor section, having been formed by rolling the interleaved foils of FIGS. 3 and 4.

FIG. 7 shows in top view the section of FIG. 6.

FIG. 8 shows a front view of a multiple capacitor package assembly of this invention.

FIG. 9 shows a side view of the assembly of FIG. 8.

FIG. 10 shows a top view taken in section 10—10 of the assembly of FIG. 8.

FIG. 11 shows an electrical circuit diagram representing the assembly of FIG. 8.

DESCRIPTION OF THE PREFERRED EMBODIMENTS

There is shown in FIG. 1 a first preferred embodiment of the present invention wherein six electrolytic capacitor packages, 10a through 10f, are connected in parallel to a stripline. The stripline is comprised of an insulative board 11 having two metal sheets 12 and 13 bonded to opposite surfaces of the board 11, and is conveniently fabricated from a standard double-sized printed wiring board. More generally, the stripline may be composed of an insulating layer with metal parts being bonded to and covering major portions of the opposite surfaces of the insulating layer.

A lower portion of the stripline, as shown in FIG. 1, extends away from the region of the stripline wherein the connections of the capacitor packages are made. This lower portion of the stripline is extended in order to provide electrical access to the multiple capacitor assembly. For this purpose two metal terminals 14 and 15 are connected to the metal sheets 12 and 13, respectively, in this extended portion of the stripline.

A typical electrolytic capacitor package 10 is shown in FIG. 2 having an anode lead 20 and a cathode lead 21 extending from an end face of the housing 22. The anode lead 20 has been cut to a length such that when threaded though a hole in the printed wiring board, provided therefor, it extends just briefly from the opposite face on which metal sheet 12, in FIG. 1, is bonded. The cathode lead is longer so that when it is threaded through an adjacent hole in the printed wiring board, it may bend and lock against the metal sheet 12.

Each capacitor package 10 as illustrated in FIG. 2 contains a convolutely wound electrolytic capacitor section 30 as shown in FIG. 6 that is formed by rolling or winding together on a mandrel (not shown) an anode foil 23 and a cathode foil 24 with porous insulative webs 25 and 26 therebetween, as shown in FIGS. 3 and 4.

The foils 23 and 24 are of a valve metal, preferably aluminum, the anode foil additionally having a thin dielectric oxide film formed over the surfaces thereof and serving as the dielectric of the capacitor section. The insulative webs 25 and 26 are a porous paper as is also commonly used in the construction of foil type electrolytic capacitors. The capacitor section is impregnated with a liquid electrolyte, such as the triethanolammonium picrate in dimethylformamide of U.S. Pat. No. 2,965,816, which premeates the porous webs. A flat metal tab 20a as shown in FIG. 5 is stitched to the anode foil 23 and a similar metal tab 21a is attached by stitching to the cathode foil 24. These tabs are preferably the same valve-metal material as the foils, and their connection to the foils must be made near the center along the foils. More generally, each of these tab connections is located with respect to an end of the respective connecting foil within ¼ to ¾ of the total length of that foil, thereby helping to keep the impedance of the capacitor to a low value, especially at high frequencies.

That centrally located tabs help reduce the effective series impedance of the capacitor section can be more fully appreciated by considering the simple unwound structure as seen in FIG. 4. As seen electrically from the two tabs 20a and 21a, the spaced anode foil 23 and cathode foil 24 may be considered to represent two classic transmission lines that are connected in parallel at the location of the tabs. The characteristic impedance of the combination is about half that of each transmission line. Now, when the foils are wound together into a capacitor section as illustrated in FIGS. 6 and 7, each foil has an additional self inductance. These inductances as well as the series foil resistance are effectively reduced, as seen from tabs that are located and attached in a central region of the foils, as compared to the series L and R that would be realized if the tabs were located near the foil ends. It is known in the art, when using only one connecting tab per foil to make the connection in approximately the center of the foil to reduce the ESR and ESL. ALthough multiple tabs per foil are commonly employed to optimize the high frequency performance of such capacitors, it has been found that the gain by so doing is not great while the cost of the single tab per foil is significantly less.

Returning to FIGS. 3 and 5, the tabs 20a and 21a have the lead wires 20 and 21, respectively, connected thereto, as by crimping or electrical resistance welding. The lead wires 20 and 21 are preferably tinned copper and extend in the same axial direction, relative to the axis 31 of the wound section as shown in FIG. 6. Furthermore, the tabs and therefore the leads 20 and 21 are conected at predetermined relative locations along the respective foils 23 and 24 so that the leads are approximately spaced apart the required and predetermined distance between the holes provided therefor in the printed wire board.

More generally, the end of the section shown in FIG. 7 defines a plane, namely the plane of the paper, wherein the axis 31 may be considered the center of a rectangular coordinate system having coordinates 33 and 34 the two leads extending through the plane at points that are in opposite quadrants of this coordinate system. Closer spacing between tabs and or leads would tend to reduce the effective series inductance of the capacitor package but greatly aids in making an easy and low cost assembly. Furthermore, the series inductance associated with the spaced leads is minimized in the assembly of this invention by keeping the leads very short, i.e. just long enough to reach though the stripline.

This in turn is compatible with the need to employ a low characteristic impedance stripline which requires that the insulating layer or board therein be quite thin, preferably less than ⅛ inch (3.175 mm). The board 11 in FIG. 1 and the board 41 in FIGS. 8, 9 and 10 to be discussed are shown larger than scale to more clearly show the construction details.

In FIGS. 8, 9 and 10 there is shown a four capacitor assembly of this invention, the capacitor packages 40a, 40b, 40c and 40d being mounted to a stripline having an insulating board 41 and copper sheets 42 and 43 bonded to opposite surfaces of the board 41. In an exemplary manner for all four capacitor packages, the capacitor package 40d consists of a convolutely wound foiltype capacitor section 63 having an anode tab 56a and a cathode tab 57a to which there is connected an anode lead 56 and a cathode lead 57, respectively. The section is contained within a metal housing 72 that is preferably an aluminum can with an open end in which an elastomeric insulative bung 75 is sealed, as by spin forming the mouth of the housing to compress the bung and to further compress the bung about the leads 56 and 57 that pass through tight fitting holes therein. An insulative plastic covering 71 is fitted about an outer surface portion of the metal housing, which covering extends over a portion of the housing end face from which the leads are axially extended.

This end face of the capacitor package 40d abuts the stripline copper sheet 43, the leads 56 and 57 having been threaded through holes in the stripline. The longer cathode lead 57 is bent over to lock the package 40d to the stripline. Packages 40a, 40b and 40c are similarly mounted to the stripline. The copper sheet 43 is removed in a circular region coaxial to the cathode leads such as lead 57, while the copper sheet 42 is removed in a circular region 47 coaxial to the anode leads such as lead 56. The copper sheet may be solder coated and the assembly wave soldered to reflow the solder of the copper sheets and of the tinned copper leads so that as illustrated in FIG. 10, solder connections are made between cathode leads 57 and the copper sheet 42 and between anode leads 56 and copper sheet 43.

Two terminals 64 and 65, each has a first planar surface portion that abuts one of the metal sheets 42 and 43, respectively, and is soldered thereto. Each of the terminals 64 and 65 also has a second planar surface portion that is orthogonal to the first planar portion. The second planar surface portions lie in a common plane 76 that is perpendicular to the plane 77 of the board so as to serve as a mounting means as well as a convenient electrical connective means for connecting the assembly to a d.c. power buss or the like. Holes 66 and 67 in terminal 64 may be used for making a bolted connection.

The electrical circuit diagram of FIG. 11 represents the assembly of FIGS. 8, 9 and 10, wherein it is made clear that terminal 64 is the cathode terminal and terminal 65 is the anode terminal for the multiple capacitor assembly.

Series of experimental assemblies were built having a configuration similar to that shown in FIG. 1. One assembly included only 1 capacitor package, another 2, and so on to an assembly containing 12 capacitor packages.

All of the capacitor packages employed in this experimental series were made in accordance with the above descriptions of FIGS. 2, 3, 4, 6 and 7.

The aluminum anode and cathode foils 23 and 24 were 7/16 inch (11.11 mm) wide, were etched and had a thickness of about 0.003 inch (0.076 mm). The insulative webs 25 and 26 were 0.002 inch (0.051 mm) thick Kraft paper. The anode foil was about 20 inches (508 mm) long while the cathode foil was longer. From the start (inside) ends of the two foils in the wound section, the anode and cathode tabs were stitched to the anode and cathode foils at a region that was 6 7/8 inches (174.625 mm) and 7¾ inches (196.850 mm) from the start ends, respectively. The capacitor packages were rated at 1500 $\mu$fd and 6.3 VDC and had a diameter of 0.63 inch (16.002 mm). The electrolyte was triethanolammonium picrate in dimethylformamide solvent and the bung was made of butyl rubber.

The insulative board 11 of the stripline was a 0.060 inch (1.524 mm) thick epoxy glass having copper sheets 12 and 13 of 0.002 inch (0.051 mm) thickness bonded on either side.

Measurements of the assemblies were made at the terminals 14 and 15, a summary of the data presented below comparing the performance of assemblies having one, two, four and 12 capacitor packages, respectively.

| Number of Packages | 1 | 2 | 4 | 12 |
| --- | --- | --- | --- | --- |
| Cap($\mu$fd) | 2.340 | 4,500 | 9,200 | 28,100 |
| ESR(ohms) | .064 | .038 | .020 | .007 |
| ESL(h hny) | 19 | 13 | 11 | 10 |
| Z(milli ohms) | | | | |
| at 0.5 KHz | 160 | 85 | 41 | 14 |
| at 1 KHz | 100 | 53 | 26 | 9 |
| at 10 KHz | 60 | 30 | 14 | 6 |
| at 100 KHz | 60 | 30 | 16 | 9 |
| at 500 KHz | 85 | 50 | 36 | 33 |

The data show that at least four capacitor packages are required to achieve a substantial reduction in the ESL and high frequency impedance, and that more than four packages do not result in further substantial reductions in these figures of merit at high frequencies.

A comparison of the above data for four and twelve capacitor packages per assembly with the above mentioned capacitors described by Markarian et al reveals that the range of frequencies of the assemblies of this invention, for which the impedance remains low, is almost as great whereas the absolute values of ESL and the high frequency impedances are greater by factors of about 2 to 5. However, it will be recognized by those skilled in the art that such a comparison of absolute values is not completely meaningful and that the achievement of such high frequency performance in a low cost capacitor assembly is unique and of considerable commercial importance for use in regulated d.c. power supplies.

For example, manufacturing cost estimates of six section, 12 section and 32 section capacitor packages of this invention (based on a 6.3 volt rating) indicate costs per 1000 mfd of 14, 10 and 8 cents, respectively. Even at the nominal mfd value of the 6 section package, the cost per 1000 mfd is significantly less than the aforementioned prior art high frequency capacitor structures. Therefore, in application and service these two capacitor structures offer complementary features and advantages.

What is claimed is:

1. A low impedance multiple electrolytic capacitor assembly comprising:
   a. at least four electrolytic capacitor packages, each of said packages comprising a convolutely wound foil-type electrolytic capacitor section, a housing containing each said capacitor section, an anode lead and a cathode lead extending from a common end face of said housing to provide electrical access to said each capacitor package; and
   b. a stripline comprising an insulative layer, a first metal part and a second metal part being bonded to and covering major portions of the opposite surfaces of said insulating layer, respectively, said anode lead and said cathode lead of each of said capacitor packages extending through holes provided therefor in said stripline, each of said anode leads being connected to said first metal part and each of said cathode leads being connected to said second metal part, said end face of each of said capacitor packages being adjacent to said stripline, a portion of said stripline extending away from the region wherein said connections of said leads are formed, thereby providing electrical access to said multiple capacitor assembly.

2. The assembly of claim 1 wherein portions of said first metal part have been removed in the regions surrounding said holes through which said cathode leads extend, and portions of said second metal part have been removed in the regions surrounding said holes through which said anode leads extend.

3. The assembly of claim 2 wherein said stripline is comprised of a double-sized printed wiring board, said first and second metal parts being first and second metal sheets, respectively, and said insulative layer being an insulative board.

4. The assembly of claim 3 additionally comprising an anode terminal and a cathode terminal being attached to said first and second metal sheets respectively at said extended portion of said stripline.

5. The assembly of claim 4 wherein each of said terminals is a metal piece having first and second planar and mutually orthogonal surface portions, said attachments to said metal sheets being effected to said first planar surfaces of said terminals, said second planar surfaces of said terminals lying in a common plane that is perpendicular to the plane of said board, said second planar surfaces being adapted for making a broad electrical and physical connection between said assembly and an electrical apparatus.

6. The assembly of claim 1 wherein said capacitor section comprises a valve-metal anode foil having a dielectric valve-metal oxide film formed thereon, a valve-metal cathode foil, a porous insulating web between said foils, said foils and said insulating web being convolutely wound together, a metal anode tab having one portion thereof connected to said anode foil, a metal cathode tab having one portion thereof connected to said cathode foil, each of said anode and cathode tab connections being located with respect to an end of said respective foil within ¼ to ¾ of the total length of said respective foil, and an electrolyte within said porous web.

7. The assembly of claim 6 wherein for each said capacitor package said housing comprises an aluminum can having one open end at said end face, and an elastomeric insulative bung being sealed in said open end, said anode lead and said cathode lead being sealed in and extending though said bung.

8. The assembly of claim 7 wherein said housing additionally comprises an insulative plastic covering over a portion of the outer surfaces of said aluminum can, and extending over a portion of said end face from which said leads extend.

9. The assembly of claim 6 wherein for said each capacitor package an end of said convolutely wound foils defines a plane, the axis of said wound foils defining the center of a rectangular coordinate system in said plane and said leads of said each capacitor package extending though said plane at points that are in opposite quadrants of said coordinate system.

10. The assembly of claim 6 wherein said end face of each said capacitor package abuts said printed wiring board.

* * * * *